(12) United States Patent
Le

(10) Patent No.: US 10,178,716 B2
(45) Date of Patent: Jan. 8, 2019

(54) LED DRIVER CIRCUIT AND METHOD

(75) Inventor: Nguyen Trieu Luan Le, Cormelles le Royal (FR)

(73) Assignee: NXP B.V., Eindhoven (NL)

(*) Notice: Subject to any disclaimer, the term of this patent is extended or adjusted under 35 U.S.C. 154(b) by 338 days.

(21) Appl. No.: 13/880,890

(22) PCT Filed: Sep. 9, 2011

(86) PCT No.: PCT/IB2011/053946
§ 371 (c)(1),
(2), (4) Date: Apr. 22, 2013

(87) PCT Pub. No.: WO2012/063141
PCT Pub. Date: May 18, 2012

(65) Prior Publication Data
US 2013/0257279 A1 Oct. 3, 2013

(30) Foreign Application Priority Data
Nov. 8, 2010 (EP) .................................. 10290597

(51) Int. Cl.
H05B 33/08 (2006.01)

(52) U.S. Cl.
CPC ..... H05B 33/0809 (2013.01); H05B 33/0812 (2013.01); H05B 33/0815 (2013.01); H05B 33/0827 (2013.01)

(58) Field of Classification Search
CPC ............ H05B 33/0809; H05B 33/0812; H05B 33/0815; H05B 33/0827
USPC .............................................. 315/113, 185 R
See application file for complete search history.

(56) References Cited

U.S. PATENT DOCUMENTS

| | | | |
|---|---|---|---|
| 7,235,899 B2* | 6/2007 | Otake | ............................. 307/82 |
| 8,169,156 B2* | 5/2012 | Hsu | ..................... H05B 33/0815 315/185 S |
| 8,269,430 B2* | 9/2012 | Nakai | ................. H05B 33/0815 315/185 R |
| 8,400,081 B2* | 3/2013 | Catalano et al. | ............. 315/309 |
| 2008/0309255 A1 | 12/2008 | Myers et al. | |
| 2009/0072760 A1 | 3/2009 | Schwalenberg et al. | |
| 2009/0128045 A1 | 5/2009 | Szczeszynski et al. | |
| 2009/0230874 A1 | 9/2009 | Zhao et al. | |
| 2010/0013395 A1 | 1/2010 | Archibald et al. | |
| 2010/0194308 A1 | 8/2010 | Zhao et al. | |

OTHER PUBLICATIONS

International Search Report and Written Opinion for Int'l. Patent Application No. PCT/IB2011/053946 (dated Apr. 2, 2012).

* cited by examiner

*Primary Examiner* — Lincoln Donovan
*Assistant Examiner* — Colleen O Toole

(57) ABSTRACT

An LED driver design has a single controller used to drive multiple strings of LEDs. In one aspect there is dynamic threshold voltage setting so that the individual characteristics of the LED strings can be taken into account in the voltage control loop. In another aspect, excess energy is dissipated off-chip in a dedicated heat dissipater, and the routing of current to the heat dissipater is controlled dynamically such that a desired integrated circuit biasing remains stable.

12 Claims, 16 Drawing Sheets

LED DRIVER CIRCUIT AND METHOD

This invention relates to the control of LEDs.

The replacement of Cold Cathode Fluorescent Lamp (CCFL) by Electro-Luminescent Diodes is becoming more common due to the lower cost of LED solutions as well as superior performance in terms of contrast.

In typical modern LED illuminated displays (TV, notebook), several LED strings are used to cover the entire display surface. These strings are placed either on the edge of the display (edge lit) or directly behind the display (direct lit).

The typical block diagram of a LED backlight driver (with a boost converter) is shown in FIG. 1.

A DC/DC converter 10 is built to provide the high side voltage of the LED string ($V_{OUT}$) whereas a current source 12 supplies the LED with the appropriate current ($I_{LED}$). The voltage at the low side of the LED string 14 ($V_{FB}$) is controlled by a feedback loop ensuring sufficient headroom for the current source while minimizing the power dissipation across this current source (better efficiency). If $V_{FB}$ is below a reference voltage $V_{REF}$, the DC/DC converter output power is increased to increase $V_{OUT}$ and thus $V_{FB}$.

In order to control the brightness of the LED, a pulse width modulation of the LED current is used. This modifies the average value of the current and thus the brightness of the LED.

FIG. 2 shows the LED current pulse width modulation, and shows the PWM signal as the top plot and the average current as the bottom plot.

Current products on the market use two different basic configurations:

(i) One dedicated power conversion stage (AC or DC/DC boost or buck or fly-back) and a feedback loop per LED string.

(ii) One common power conversion stage and a feedback loop for several LED strings.

The solution (i) is best optimized in terms of efficiency as well as heat dissipation as the dedicated DC/DC boost will adjust $V_{OUT}$ to get the lowest $V_{FB}$ for each and every LED string. This approach is shown in FIG. 3, which essentially comprises multiple circuits of FIG. 1 in parallel. The disadvantage is the cost due to a higher number of used components as well as the board area occupation.

For cost reduction reasons, the solution (ii) with one DC/DC boost and feedback loop for several LED strings can be preferred. The lowest $V_{FB}$ is extracted and used to control $V_{OUT}$. This solution is for example described US2009230874, from which FIG. 4 is taken.

The drawback of the solution (ii) is twofold:

(i) Heat Dissipation

The LED string forward voltage mismatch can cause severe heat dissipation for the current regulators. As the system will adjust $V_{OUT}$ for the channel with the highest LED forward voltage drop, $V_{FB}(VT)$ for the other channels will be higher than the minimum regulated value due to LED string mismatch.

For explanation a system is assumed with a minimum set-point for $V_{FB}(VT)$ of 0.7V, a nominal LED string forward voltage of 80V and 3% mismatch maximum between strings, 4 LED strings to be driven with 300 mA current per string and 50% duty cycle PWM.

The IC for this system will have to dissipate 0.5*0.3 A*(0.7V+3*(0.7V+80V*3/100))=1.5 W in worst case mismatch instead of 0.42 W in case there is no mismatch in the LED string forward voltage.

This heat limitation limits the number of LED strings that can be supplied by one power converter and/or increases the number of IC to be used due to the heat dissipation capability of available packages. All of this increases the overall cost of the application.

FIG. 5 shows a generic circuit diagram, for a single controller 50 controlling a set of strings 51 of LEDs. A feedback block 52 is shown generically. In the prior art method this is a minimum selector as explained above.

The example figures above are inserted into FIG. 5 to show the effect of the LED string forward voltage mismatch.

(ii) Speed of Operation

As the DC/DC clock speed is limited to a few hundred of kHz for practical reasons (component size, signal speed, switching losses), the loop speed is limited. In case independent dimming signals are used (called 2D or local dimming), switching from a low forward voltage string to a high forward voltage string can cause $V_{FB}$ of the latter string to be below the operating limit of its current source. The LED current of the latter string may then be well below the desired value.

As a practical example, consider that in FIG. 5 only the channel 3 is on. The forward voltage Vf is 80V*97%=77.6V for this string and the feedback control loop will react such that $V_{FB3}$ is 0.7V (no other string is on). $V_{OUT}$ will then be adjusted to 78.3V (0.7V+77.6V). If now channel 2 is switched on, knowing that the forward voltage of this string is 80V, there is $V_{FB2}$=78.3V−80V=−1.7V. The current source of the channel 2 can not deliver any current under this condition before the loop increases the DC/DC power transfer to get $V_{OUT}$ reaching 80.7V.

This can take a long time due to the slow speed of the DC/DC converter and no light will be emitted by the string 2 during this time.

The invention is directed to these two problems.

According to a first aspect of the invention, there is provided an LED driver for driving a plurality of strings of LEDs, comprising:

a controller for controlling a voltage or a current flow applied to one end of each of the strings of LEDs;

a plurality of threshold circuits, wherein each threshold circuit is for comparing the voltage at the other end of a respective string of LEDs with a respective threshold voltage; and a combiner for combining the threshold circuit outputs thereby to generate a signal for controlling the controller.

This aspect of the invention provides a shared controller between multiple strings of LEDs. This reduces the amount of circuitry required. In order to improve the efficiency of the system, individual threshold circuits are provided so that the voltage control function takes into account the individual requirements of the different strings of LEDs, and does not simply react to the lowest voltage present. The threshold circuits enable voltage boosting to be delayed until the voltage boosting really is required to maintain the desired voltage levels elsewhere in the circuit.

Each threshold voltage for example comprises the voltage at the other end of the string of LEDs in response to the same voltage ($V_{OUT}$) applied to the one end of the string of LEDs. Thus, the threshold voltages take into account the differences in response of the different strings to a given drive voltage.

The driver can further comprise:

a current balancing arrangement for each string of LEDs, wherein the other end of the string of LEDs is connected to the current balancing arrangement through first and second paths, the first path comprising a heat dissipater, wherein the current balancing arrangement is part of an integrated circuit, the heat dissipater is external to the integrated circuit, and the current balancing arrangement is adapted to control the splitting of the current through the LED string between the first and second paths.

This arrangement enables heat dissipation to take place off the integrated circuit, and in a controlled manner, so that the generation of the required integrated circuit biasing voltage is assured, and excess current can then be dissipated.

According to a second aspect of the invention, there is provided an LED driver for driving a plurality of strings of LEDs, comprising:

a controller for controlling a voltage or a current flow applied to one end of each of the strings of LEDs in dependence on voltages measured at the other ends of the strings of LEDs;

a respective current controller for each string of LEDs for controlling the current in each string of LEDs independently;

a current balancing arrangement for each string of LEDs, wherein the other end of the string of LEDs is connected to the current balancing arrangement (88) through first (80) and second paths, the first path comprising a heat dissipater ($R_{HEAT}$), wherein the current balancing arrangement is part of an integrated circuit, the heat dissipater is external to the integrated circuit, and the current balancing arrangement is adapted to control the splitting of the current through the LED string between the first and second paths.

This provides the external heat dissipation aspect outlined above.

The invention in its two aspects provides solutions to solve the two above mentioned issues. The invention offers solutions having only one power conversion stage (AC or DC/DC buck or boost or fly-back) supplying several LED strings, each of which can be driven independently (for example by a dedicated independent PWM dimming signal) without facing the current source saturation as well as the high heat dissipation due to LED string voltage mismatch.

The benefit is total system cost reduction by removing the constraint on LED string matching and using fewer chips. The two aspects above can be employed independently to each other. The heat reduction/dissipation concept can be implemented without having the LED string forward threshold voltage setting and vice-versa. The invention provides an approach which gives advanced dynamic headroom control for a multi LED-string driver.

The current balancing arrangement can comprise a feedback path for maintaining constant a biasing voltage for the integrated circuit. This assures the integrated circuit biasing. Energy is then only dissipated in the external resistor if this is possible while maintaining the biasing voltage. Thus, the headroom is controlled dynamically.

The heat dissipater can comprise:

a single resistor; or a parallel set of resistors each having an associated control transistor; or a series set of resistors each having an associated control transistor.

The use of multiple resistors enables the control transistors to pass between their linear and saturated modes of operation in a staggered manner, and this can improve the efficiency of the system. In this case of a set of resistors, the associated control transistors are each between a terminal of the associated resistor and a common terminal ($V_{ISRC}$), and the current balancing arrangement is adapted to control a first transistor in the second path and the set of control transistors. Thus, both paths are actively controlled.

The first aspect of the invention also provides a method of controlling a plurality of strings of LEDs, comprising:

controlling a voltage or a current flow applied to one end of each of the strings of LEDs;

comparing the voltage at the other end of a respective string of LEDs with a respective threshold voltage; and combining the threshold comparisons and controlling the controller based on the combination.

Determining the threshold voltages can be by:

applying an increasing voltage to the one end of the strings of LEDs;

monitoring the voltages at the other end of the strings of LEDs;

when the voltage at the other end of all of the strings of LEDs has reached a minimum threshold, storing the voltages at the other end of all of the strings as the individual threshold voltages for the different strings of LEDs.

The second aspect of the invention also provides a method of controlling a plurality of strings of LEDs, comprising:

controlling a voltage or a current flow applied to one end of each of the strings of LEDs in dependence on voltages measured at the other ends of the strings of LEDs;

coupling the other end of each string of LEDs to a respective current balancing arrangement which is part of an integrated circuit, through first and second paths, the first path comprising a heat dissipater which is external to the integrated circuit; and controlling the splitting of the current through each LED string between the first and second paths.

The invention also provides an LED circuit comprising the driver of the invention and a plurality of strings of LEDs. Each string preferably comprises a plurality of series-connected LEDs, but a string should be understood as being able to include a single LED.

Examples of the invention will now be described in detail with reference to the accompanying drawings, in which.

The invention provides a driver design in which a single controller can be used to drive multiple stings of LEDs, but in one aspect with dynamic threshold voltage setting so that the individual characteristics of the LED strings can be taken into account in the voltage control loop. In another aspect, excess energy is dissipated off-chip in a dedicated heat dissipater, and the routing of current to the heat dissipater is controlled dynamically such that a desired integrated circuit biasing remains stable.

Figure 1:
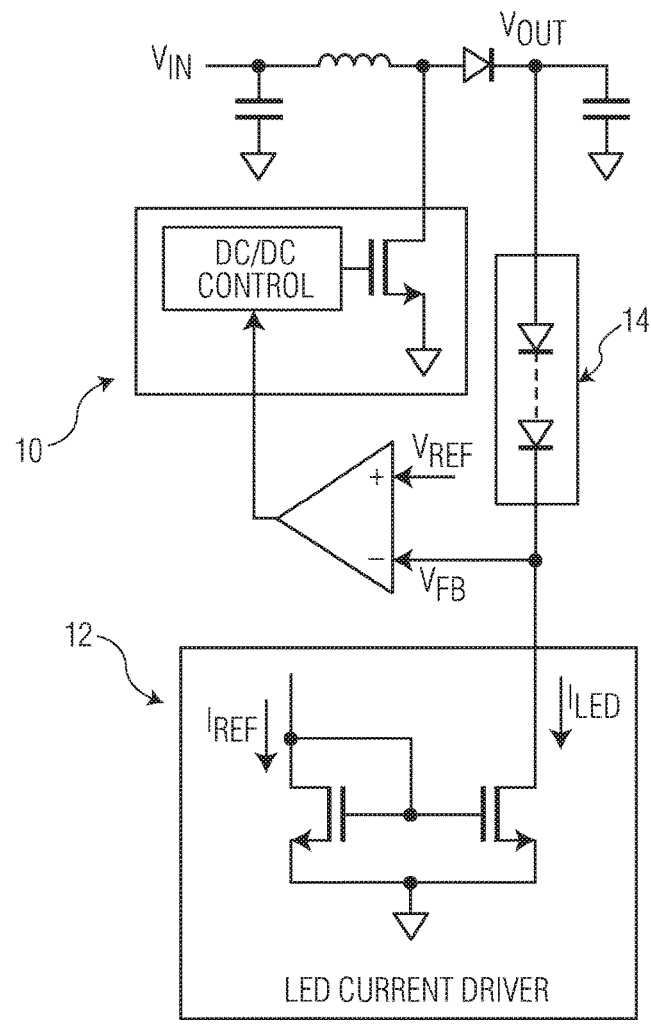
FIG. 1 shows a typical block diagram of a LED backlight driver with a boost converter.
Figure 2:
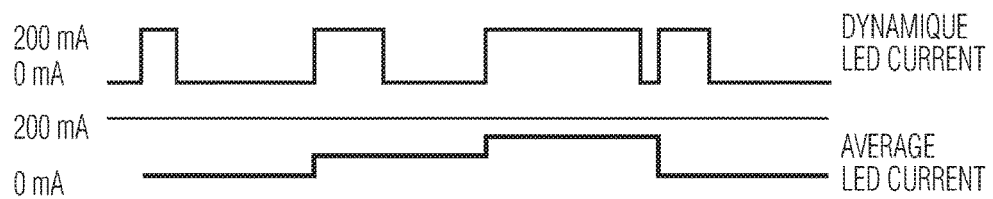
FIG. 2 shows the LED current pulse width modulation.
Figure 3:
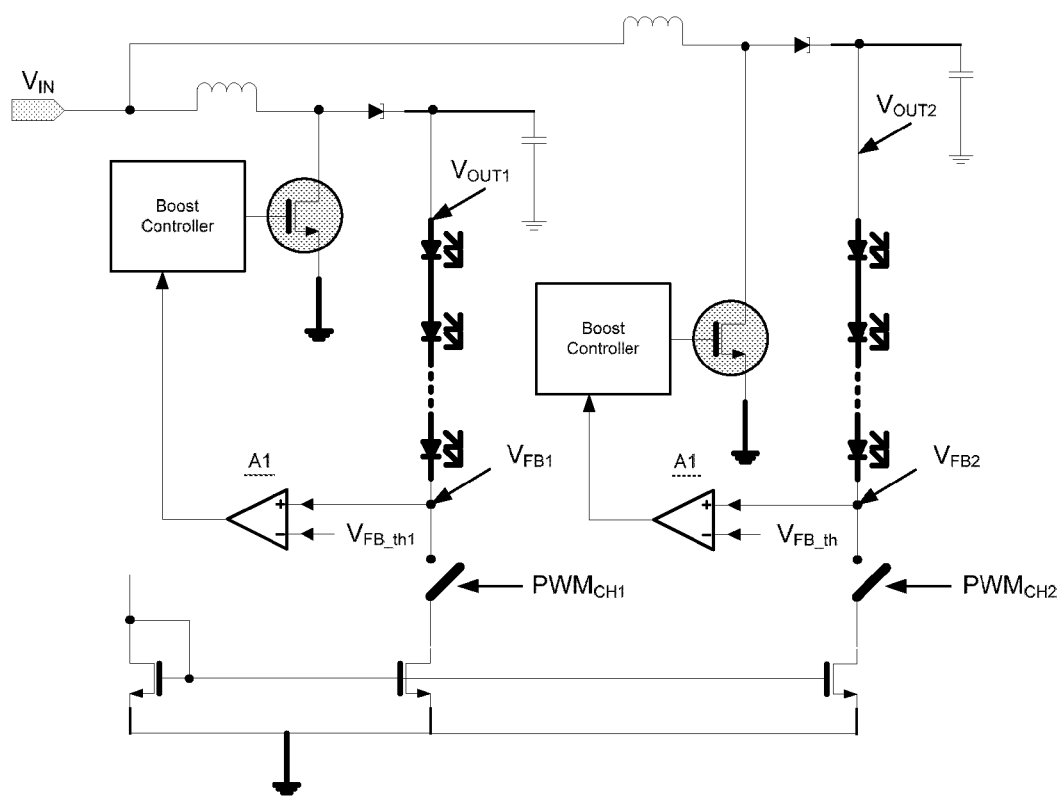
FIG. 3 shows a known design with one dedicated power conversion stage and a feedback loop per LED string.
Figure 4:
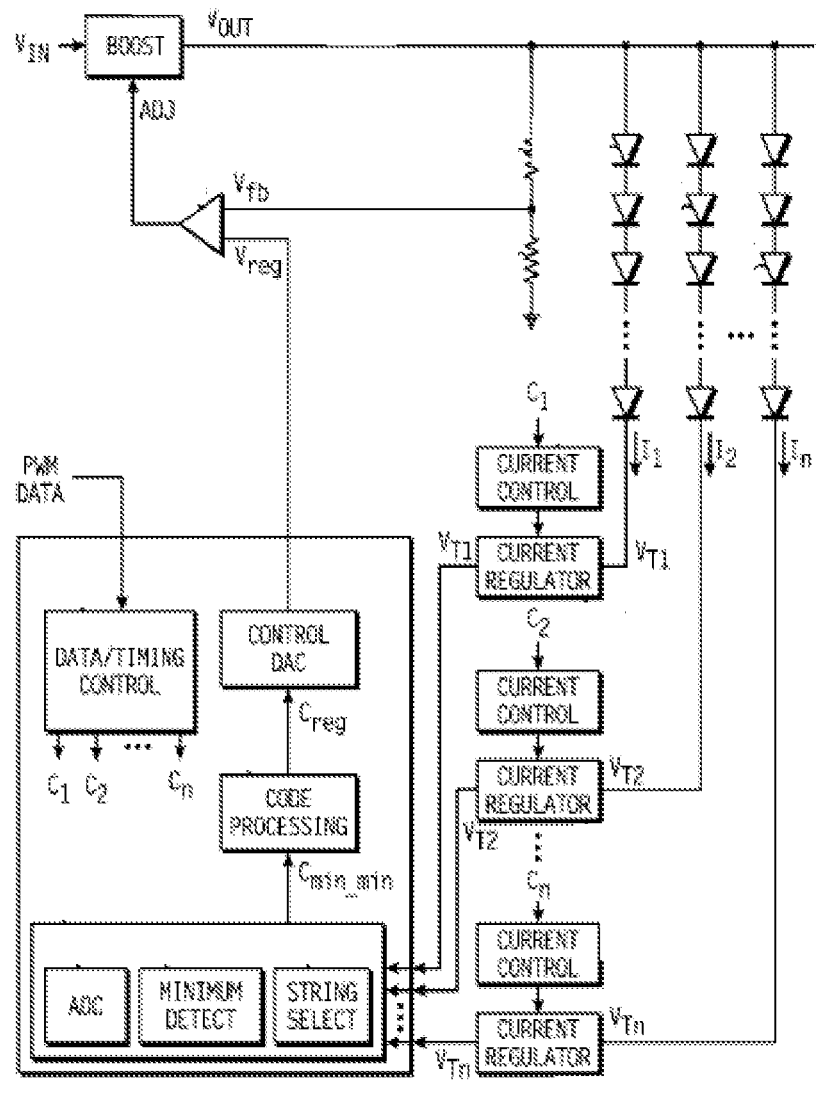
FIG. 4 shows a known design with one common power conversion stage and a feedback loop for several LED strings.
Figure 5:
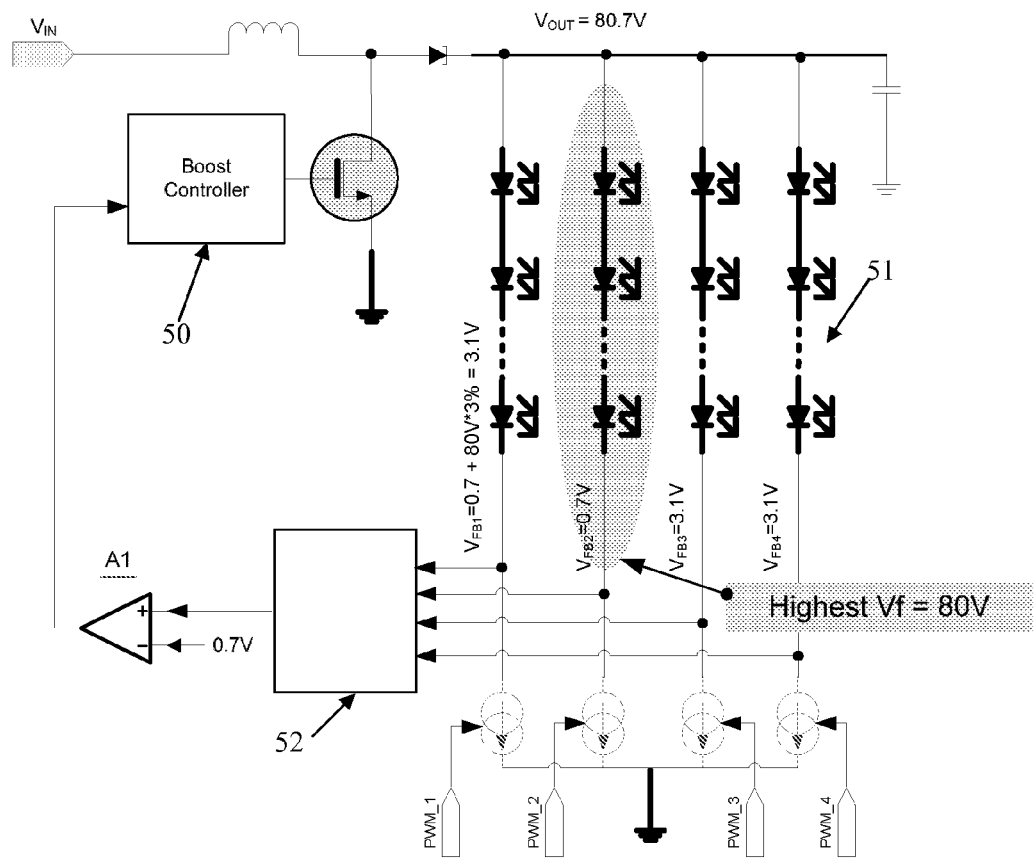
FIG. 5 shows an arrangement with one common power conversion stage and a feedback loop for several LED strings and which can be controlled in accordance with the invention.

The invention can be applied to the circuit of FIG. 5, which shows a system with 4 LED strings and 4 independent dimming PWM signals, one per channel. The 4 strings are supplied by a unique DC/DC boost stage 50. The concept is valid for any number of LED strings and type of power conversion stage.

The first aspect of the invention can be applied by using a more intelligent feedback system in the feedback unit 52. In particular, the feedback unit 52 can be implemented as a selector circuit for setting suitable threshold values for each LED string.

Figure 6:
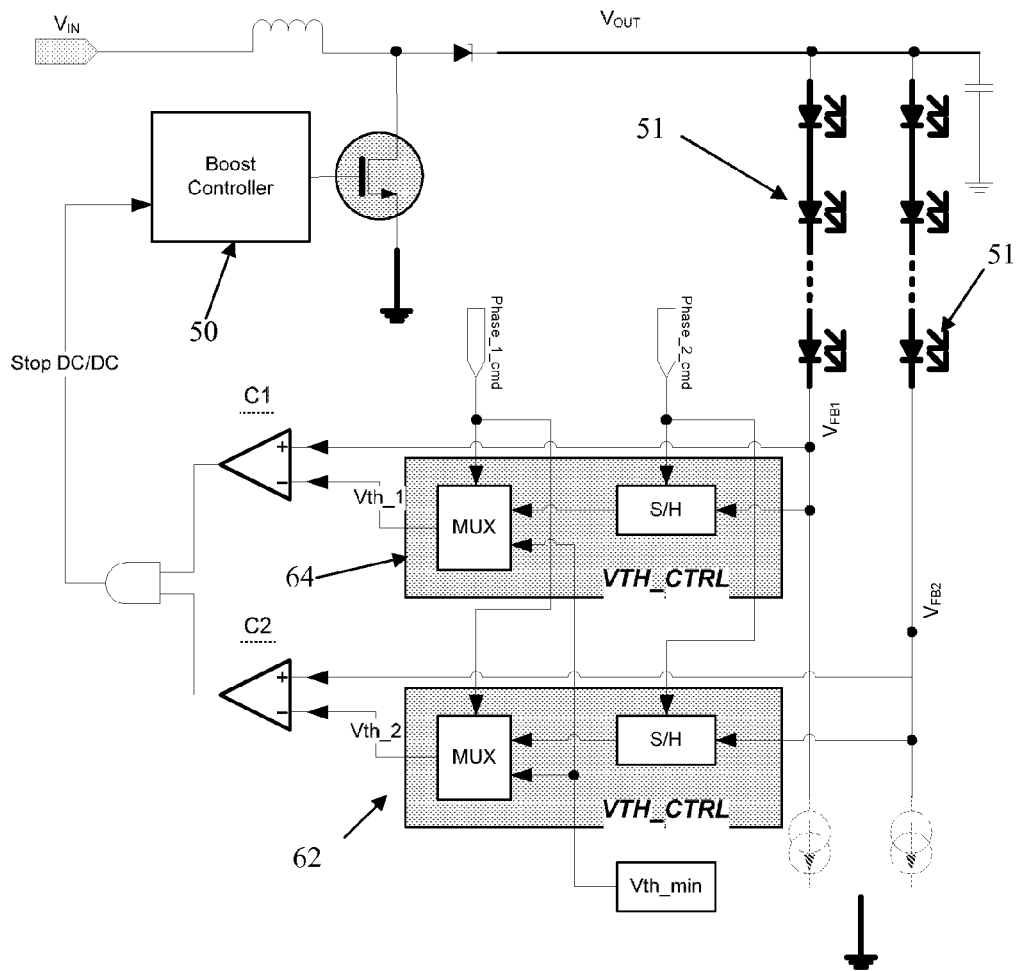
FIG. 6 shows an example of selector circuit of the invention which can be used in the arrangement of FIG. 5.

FIG. 6 shows an example of the selector circuit 52 of the invention, and shows how two LED strings are processed, for simplicity.

As shown in FIG. 6, the single boost controller 50 receives signals from the two strings, each of which has a separate threshold circuit 62, 64. Each threshold circuit 62, 64 supplies a threshold value to a comparator C1, C2, which also receives the feedback voltage $V_{FB}$ from the LED string.

LED String Forward Voltage Detection

In order to ensure that there is no distortion in the current shape due to mismatch between the feedback voltages $V_{FB}$ when switching strings, this mismatch must be included in the $V_{FB}$ threshold voltage used for the feedback loop.

First a charging phase is launched when the power converter is activated. All the LED channels are forced to be on at the same time and having the feedback loop regulating on the lowest $V_{FB}$. During this phase, called phase 1, the $V_{FB}$ voltage of each string will be compared with a common minimum threshold Vth_min. The multiplexers (MUX) of FIG. 6 set with Vth_n (with n, the string number) to Vth_min.

Thanks to the energy transfer by the DC/DC boost converter, $V_{OUT}$ increases continuously and consequently the $V_{FB}$ voltage of all channels. As soon as the lowest $V_{FB}$ exceeds the minimum desired value (Vth_min), i.e. the output of all comparators C_n has been set HIGH, the DC/DC is stopped (stop DC/DC is set HIGH) and the threshold voltage setting phase occurs (phase 2).

During this phase, the actual $V_{FB}$ voltage value at the feedback pin of each string is captured and stored. FIG. 6 shows this capture and storage operation by the use of a sample and hold circuit "S/H" but other implementations are possible such as the use of an A/D converter along with a digital register.

At that time, the $V_{FB}$ voltage of the string with the highest forward voltage drop (Vf_max) is equal to Vth_min. For the other strings the $V_{FB}$ voltage is equal to Vth_min+(Vf_max−Vf_n), with Vf_n their own forward voltage. The $V_{FB}$ threshold voltage includes now the relative mismatch between the strings.

After this second phase, the IC will enter the normal operation phase. The multiplexers MUX set their threshold levels Vth_n to the stored $V_{FB}$ voltage value which will be used for the control of $V_{OUT}$.

Figure 7:
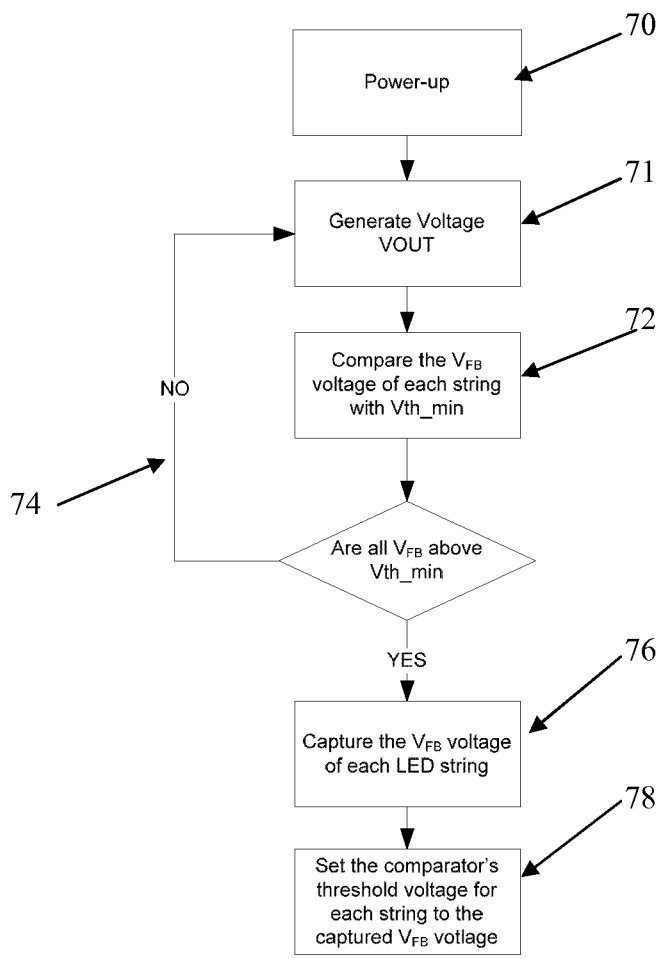
FIG. 7 shows a threshold voltage setting process of the invention.

This threshold voltage setting process is shown in FIG. 7.

As explained above, after power up in step 70, the process comprises generating an output voltage in step 71, then comparing the feedback voltage $V_{FB}$ of each LED string with the minimum threshold Vth_min (step 72). While the output voltage rises, the comparisons continue (feedback path 74) until the value of $V_{FB}$ for all strings has reach the Vth_min value. The set of $V_{FB}$ values for all strings is then stored in step 76 and the comparator thresholds are set accordingly, in step 78.

In this way, individual reference values for $V_{FB}$ are found for each LED string.

With this method, it is ensured that $V_{OUT}$ will always be at the minimum value while ensuring sufficient voltage headroom for proper operation of all current sources at any time. The DC/DC loop time constant does not need to be shorter than the LED current pulses to avoid LED current distortion.

Heat Dissipation Reduction

The second issue to solve is high heat dissipation within the chip due to the LED string forward voltage mismatch. Assuming a system with a minimum $V_{FB}$ threshold voltage of 0.7V, a nominal LED string forward voltage of 80V and 3% mismatch maximum between strings. If 4 LED strings are to be driven with 300 mA current per string at 50% duty cycle PWM (see FIG. 5) for all of them. The IC will have to dissipate 0.5*(0.7*0.3+3*(0.7+80*3/100)*0.3)=1.5 W instead of 0.42 W in case there is no mismatch in the LED string forward voltage.

Figure 8:
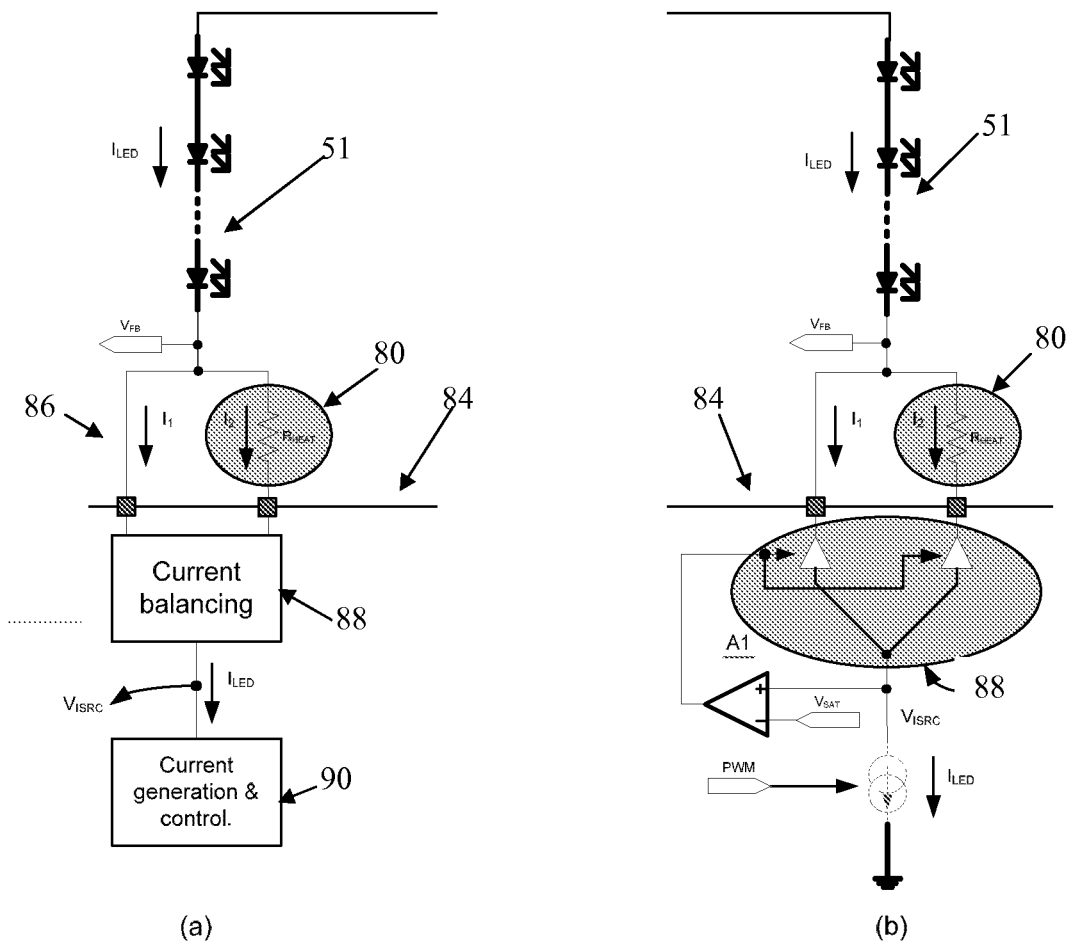
FIG. 8 is used to explain a heat dissipation reduction concept of the invention.

FIG. 8(*a*) shows the heat dissipation reduction concept. The LED string is now fed with two parallel current paths. The first path 80 contains an external power dissipation element $R_{HEAT}$ between the LED string 82 and the IC (the components below the line 84). In case of low $V_{FB}$ voltage, this path may not be able carry the full LED current while ensuring that the IC has sufficient voltage headroom to operate. The second path 86, linking directly the IC to the LED string, provides the remaining current.

The IC contains a current balancing element 88 as well as a current generation and control element 90. The current balancing element 88 is aimed at driving the maximum possible current in the first path 80 while ensuring sufficient voltage headroom for the current generation and control element 90. It will also divert the remaining current into the second path. The current generation and control element 90 supplies the required LED current and performs the dimming operation based on a dimming control signal.

In this way, the required current is provided, and the voltage headroom is ensured by the second path 86. The required heat dissipation takes place outside the IC.

There are different possible implementations of the current balancing and current generation and control. FIG. 8(*b*) shows an example of block diagram.

A feedback loop manages the split of the generated LED current into I1 (second path 86) and I2 (first path 80) in order to maintain the voltage at the node $V_{ISRC}$ constant.

The higher the $V_{FB}$ voltage value, the higher the I2 current value. It means that when $V_{FB}$ increases, the power dissipation will be shifted to the external resistor $R_{HEAT}$ instead of the IC.

The current balancing element 88 has a comparator in a feedback path so that the voltage $V_{ISRC}$ is constant, by selectively controlling transmission gates which select between the currents I1 and I2. This voltage is in this example a biasing voltage for the IC.

Figure 9:
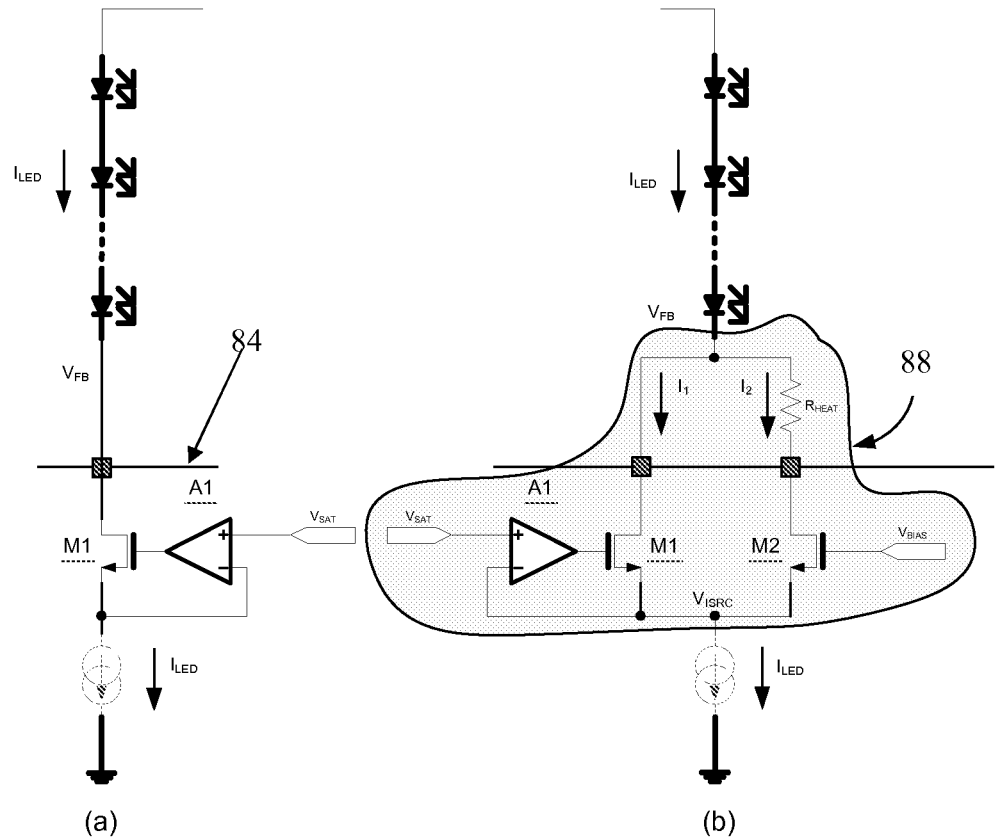
FIG. 9 shows a first implementation of the circuit of FIG. 8.

These transmission gates are shown in more detail in FIG. 9.

FIG. 9(a) is a standard implementation with feedback control of the voltage $V_{ISRC}$ but no heat dissipation circuit (i.e. no current splitting control).

FIG. 9(b) shows the implementation with the current balancing heat reduction circuit 88 of FIG. 8. The current balancing circuit comprises an amplifier A1 in a feedback path to set the voltage $V_{ISRC}$, and two transistors M1 and M2. The current balance is controlled while maintaining the voltage at the $V_{ISRC}$ node equal to a constant value $V_{SAT}$. If $V_{FB}$ increases, the loop will increase I2 in order to maintain $V_{ISRC}$ constant. $V_{SAT}$ will be chosen close to the minimum headroom voltage required by the current source in order to minimize the heat dissipation.

The proper setting of this implementation requires that the transistor M2 is always in the linear region, meaning that it acts as a resistor. The size of M2 must be chosen as high as possible (minimizing its resistance $R_{DSON}$) to take full benefits of the heat reduction effect. The optimum value of $R_{HEAT}$ depends on the maximum $V_{FB}$ voltage as well as the current $I_{LED}$.

Assuming $R_{DSON\_M2}$ is small as compared to $R_{HEAT}$ and knowing that $V_{ISRC}$ equal to $V_{SAT}$ thanks to the regulation loop, this gives:

$$I2 = \frac{VFB - VSAT}{RHEAT} \quad \text{Eq. 1}$$

$$I1 = ILED - \frac{VFB - VSAT}{RHEAT} \quad \text{Eq. 2}$$

$V_{FB}$ must always be higher than $V_{SAT}$ to ensure proper operation of the current source. This will be ensured by that feedback loop with the power conversion stage with Vth_min set to a value higher than $V_{SAT}$ (see FIG. 6).

The power dissipation (P_wohr) inside the IC without the heat reduction circuit is:

$$P\_wohr = ILED*VFB \quad \text{Eq. 3}$$

With the heat reduction circuit, part of the power dissipation is done with the external resistor $R_{HEAT}$ ($I2^2*R_{HEAT}$). Then the power dissipation (P_whr) with heat reduction in this case is $$P\_whr = ILED*VFB - I2^2 * RHEAT \quad \text{Eq. 4}$$

$$P\_whr = ILED*VFB - \frac{(VFB - VSAT)^2}{RHEAT}$$

As shown by Eq. 1, Eq. 2 and Eq. 4, when $V_{FB}$ is low (close to $V_{SAT}$), most of the current is balanced to the I1 branch and in that case the power dissipation is similar with or without the heat reduction implementation.

With the heat reduction concept, when $V_{FB}$ increases, I2 will increase accordingly and the power dissipation inside the IC is reduced (Eq. 4). The higher the $V_{FB}$ increase, the higher the IC power dissipation reduction. This has for effect to maintain almost constant the power dissipation inside the IC.

As I2 can not exceed $I_{LED}$, if $V_{FB}$ continues to increase above the limit $I_{LED}*R_{HEAT}+V_{SAT}$ the power dissipation inside the IC increases again. The power dissipation reduction reaches its maximum value which is $R_{HEAT}*I_{LED}^2$.

The table below shows the power dissipation reduction formulae as a function of $V_{FB}$.

| $V_{FB} \leq I_{LED}*R_{HEAT} + V_{SAT}$ | $V_{FB} > I_{LED}*R_{HEAT} + V_{SAT}$ |
|---|---|
| $P\_whr = ILED*VFB - \frac{(VFB - VSAT)^2}{RHEAT}$ | $P\_whr = ILED * VFB - ILED^2 * RHEAT$ |

The derivative of Eq. 4 gives:

$$\frac{\partial P\_whr}{\partial VFB} = ILED - 2*\frac{(VFB - VSAT)}{RHEAT} \quad \text{Eq. 5}$$

$$\frac{\partial P\_whr}{\partial VFB} = 0 \Rightarrow VFB - VSAT = \quad \text{Eq. 6}$$

$$\frac{ILED*RHEAT}{2} \Rightarrow VFB = \frac{ILED*RHEAT}{2} + VSAT$$

By combining Eq. 4 and Eq. 6, the maximum IC power dissipation in the region where $V_{FB} \leq I_{LED}*R_{HEAT}+V_{SAT}$ is $$P\_whr\_max = ILED*VSAT + RHEAT*\left(\frac{ILED}{2}\right)^2 \quad \text{Eq. 7}$$

This maximum power dissipation is reached when $I1=I2=I_{LED}/2$ and its value increases with $R_{HEAT}$.

Figure 10:
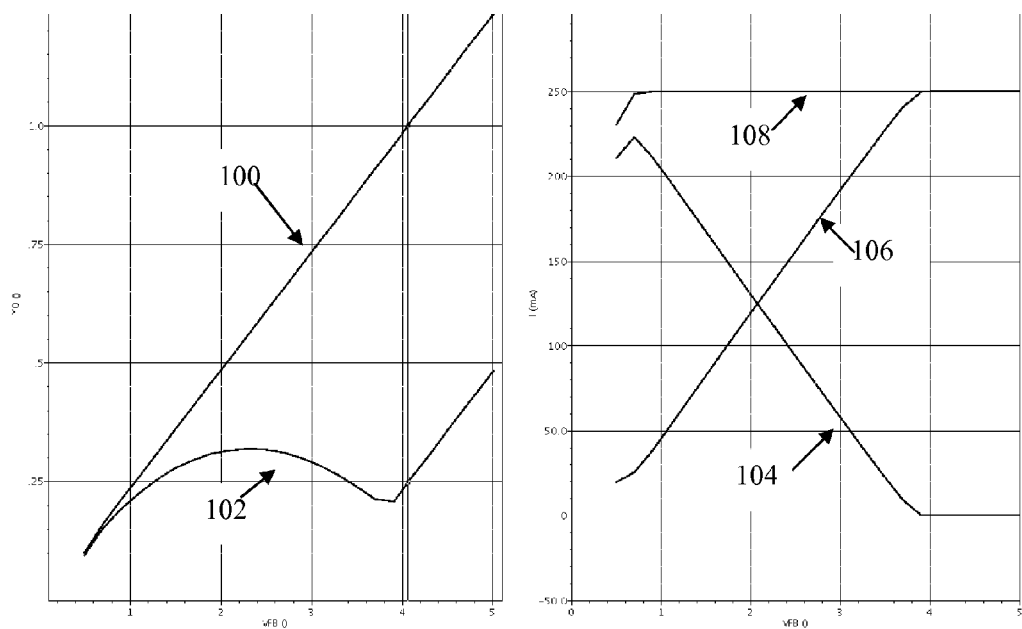
FIG. 10 shows simulation results of the heat dissipation concept implementation.

FIG. 10 shows simulation results of the heat dissipation concept implementation.

The left hand side graph shows a comparison of the heat dissipation without (plot 100) and with (plot 102) the heat dissipation concept with 12Ω $R_{HEAT}$, 250 mA $I_{LED}$ and 0.33V $V_{SAT}$. The calculated P_whr_max is 0.27 W at 2.1V $V_{FB}$ from Eq. 7.

Due to the $R_{DSON}$ of M2, the simulated value is slightly shifted (0.32 W at 2.35V). The $V_{FB}$ limit for maximum heat dissipation reduction is calculated to be at 3.33V VFB (see table above) as compared to 3.9V from the simulation (impact of M2 $R_{DSON}$). The simulated maximum heat reduction is 12×0.25²=0.75 W as calculated.

The right hand side graph shows the current through M1 (plot 104), M2 (plot 106) and the total LED current (plot 108). Including the M1 and M2 $R_{DSON}$, the minimum $V_{FB}$ for the current source to operate correctly is 0.9V ($I_{LED}$ reaches its nominal value).

Figure 11:
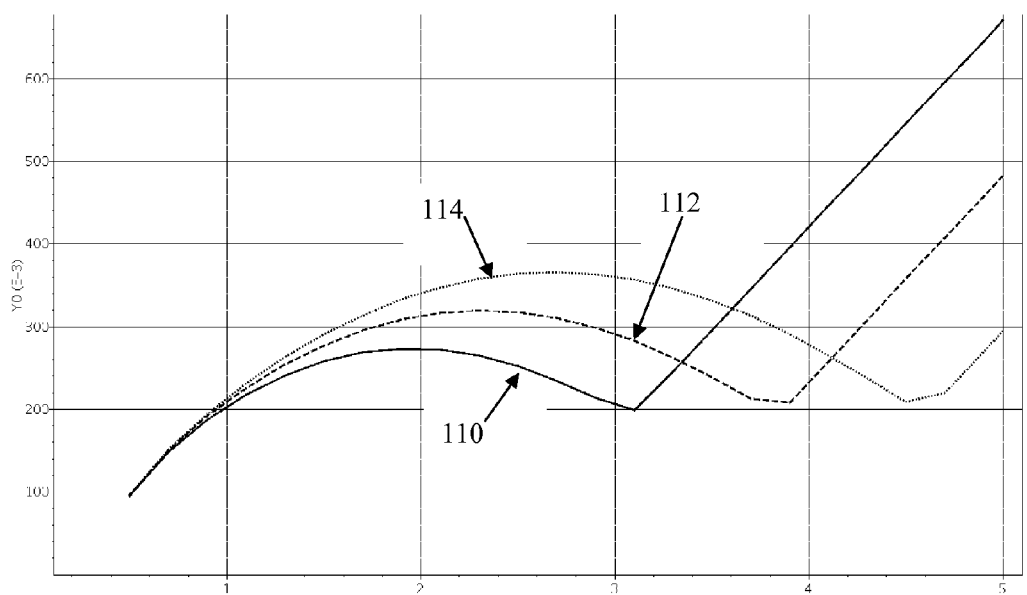
FIG. 11 shows the power dissipation for three values of heat dissipater.

FIG. 11 shows the power dissipation for 3 values of $R_{HEAT}$: 9Ω (plot 110), 12Ω (plot 112) and 15Ω (plot 114) with 250 mA $I_{LED}$. A trade-off is to be found between the extension of the region where the IC power dissipation is maintained constant (high value of $R_{HEAT}$) and the maximum IC power dissipation (low value of $R_{HEAT}$) in this region.

As explained above, the transistor M2 should be operated in the linear region. However, the heat reduction feedback loop in the example above is controlling only the transistor M1. For the $V_{FB}$ voltage above $V_{SAT}+V_{DSSAT\_M2}+I_{LED}*R_{HEAT}$, the transistor M2 is no longer in the linear region and the entire LED current is going through M2. M1 is off and the loop is no longer controlling $V_{ISRC}$. $V_{ISRC}$ is then equal to $V_{BIAS}-V_{GS\_M2}$, where $V_{GS\_M2}$ is the gate-to-source voltage of M2. This can change depending on the temperature and process variation. Due to the high amount of LED current and low VSAT value (necessary to minimize the IC heat dissipation), the output impedance of the current source is quite low (few tens of Ohms). The variation of $V_{ISRC}$ will induce variation of the LED current.

Figure 12:
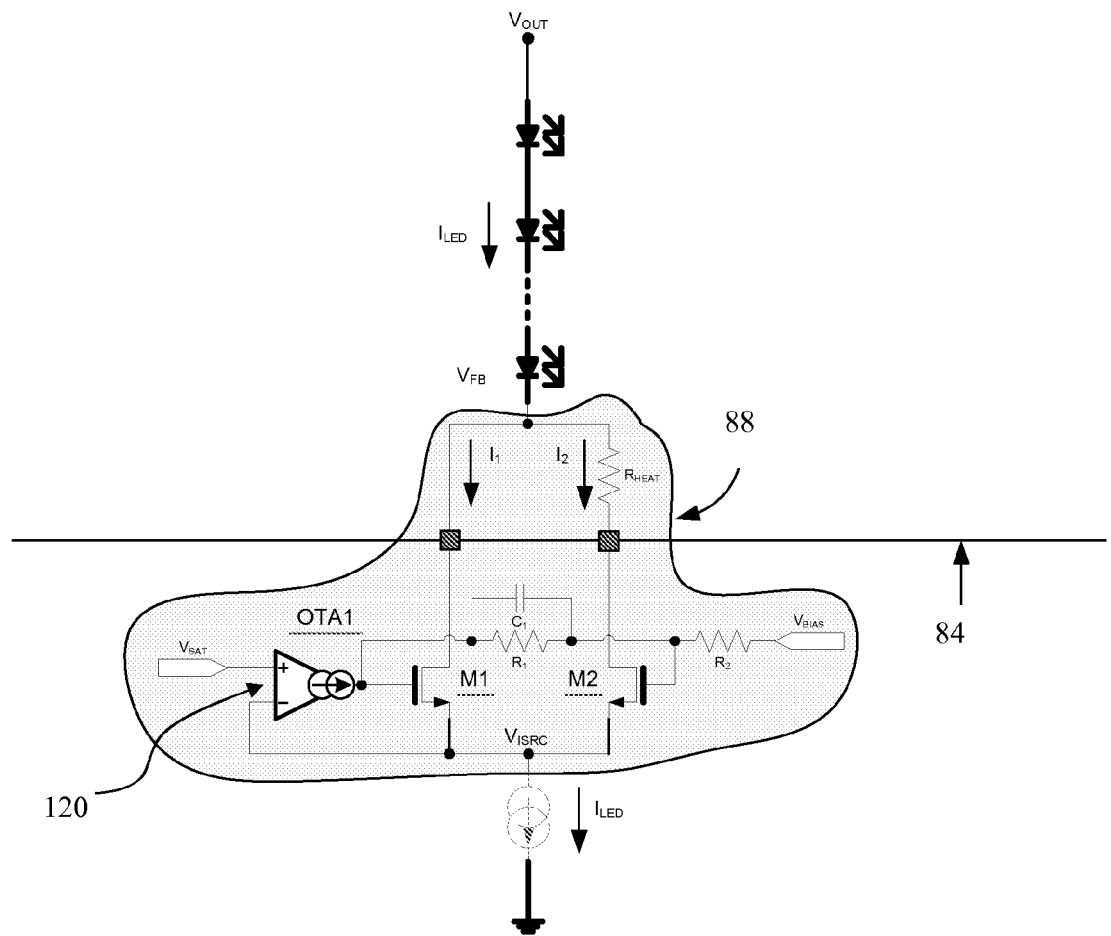
FIG. 12 shows a modification to the circuit of FIG. 9.

Thus, to improve the LED current accuracy for the whole range of $V_{FB}$, the gate of M2 can also be controlled. This can be done with a double control feedback loop as depicted in FIG. 12.

The gate of transistor M1 is controlled by an operational transconductance amplifier 120. The output is connected to the gate of transistor M1, and through resistor R1 to the gate of transistor M2. The gate of transistor M2 is also connected to the bias voltage $V_{BIAS}$ through resistor R2. The current out of the OTA goes through R1 and R2 and thus will control the gate of both M1 and M2.

The loop gain for M2 is to be made smaller than M1 (R2<R1) to take full benefits of the heat reduction. A capacitor C1 is in parallel with resistor R1 and bypasses at high frequency the pole made with R1 and the M1 gate capacitance, in order to improve the loop stability.

Figure 13:
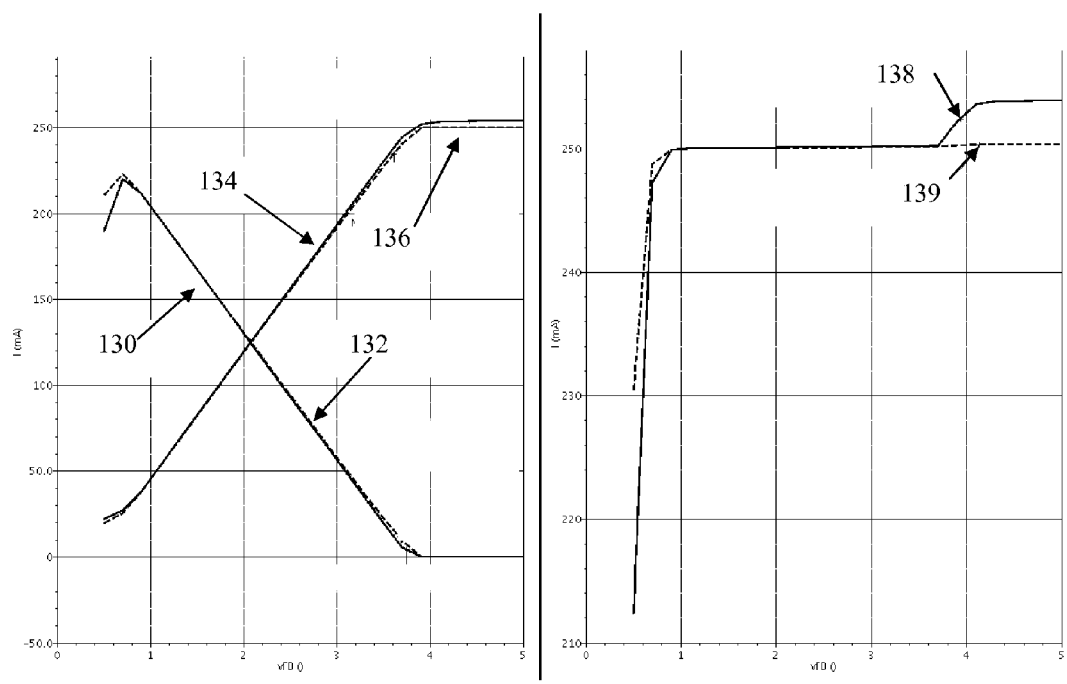
FIG. 13 shows the resulting LED current accuracy improvement based on the approach of FIG. 12.

The result of LED current accuracy improvement is shown in FIG. 13.

The left plots show the currents of M1 and M2. Plot 130 is the current through M1 without the double control loop and plot 132 is the current through M1 with the double control loop. Plot 134 is the current through M2 without the double control loop and plot 136 is the current through M2 with the double control loop.

The effect on the LED current is shown in the right plot, where 138 is the LED current without the double control loop and plot 139 is the LED current with the double control loop.

As indicated by FIG. 11 and the above formulas, increasing $R_{HEAT}$ allows to extend the power dissipation rejection zone but with the price of an increased maximum power dissipation (P_whr_max). In order to have both benefits, i.e. lower P_whr_max and large power dissipation zone, a variable resistor $R_{HEAT}$ can be used which is low value for low to medium $V_{FB}$ (decreasing P_whr_max) and high for high $V_{FB}$ (extension of power rejection zone).

Figure 14:
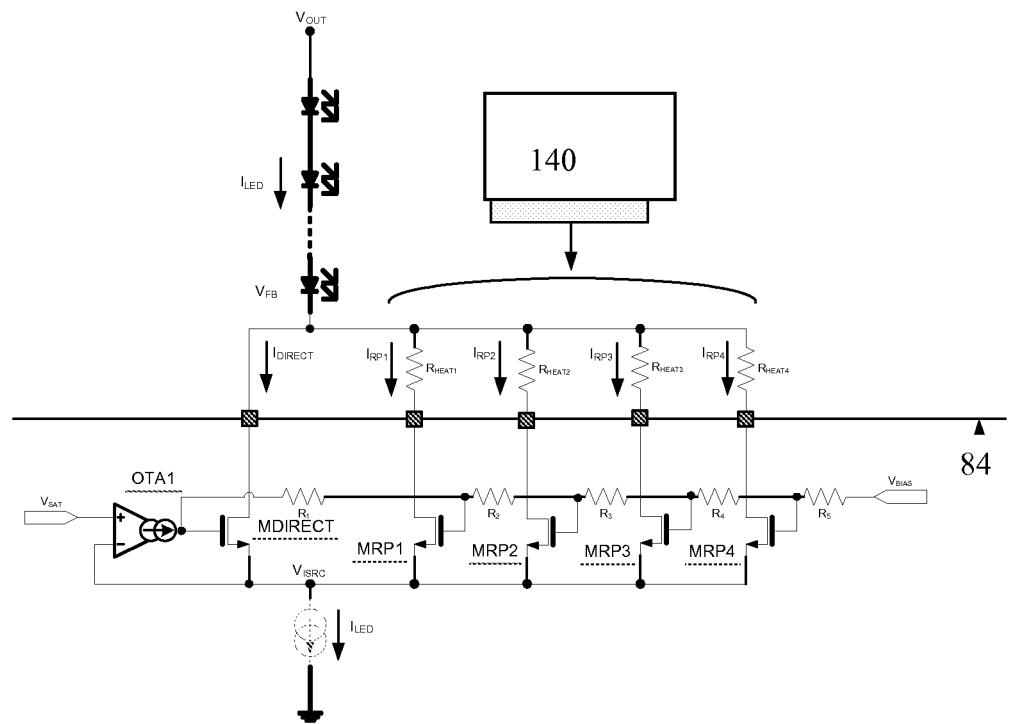
FIG. 14 shows a further modification to the circuit of FIG. 9 with multiple parallel resistive paths.

For this purpose, several resistive paths (R-paths) 140 in parallel can be used as shown in FIG. 14. Each of the R-paths 140 uses an increasing value of $R_{HEAT}$. FIG. 14 shows four external heat dissipation resistors $R_{HEAT1}$ to $R_{HEAT4}$. For low values of $V_{FB}$, all the transistors of the R-paths are in the linear region and thus the equivalent $R_{HEAT}$ value is equivalent to all $R_{HEAT}$ values in parallel. For increasing $V_{FB}$, the different transistors of the R-path are shifting progressively into the saturation region and fewer paths have transistor in linear region. The effect is an increasing equivalent value of $R_{HEAT}$ for increasing $V_{FB}$. The more R-paths, the flatter the power dissipation curves.

Figure 15:
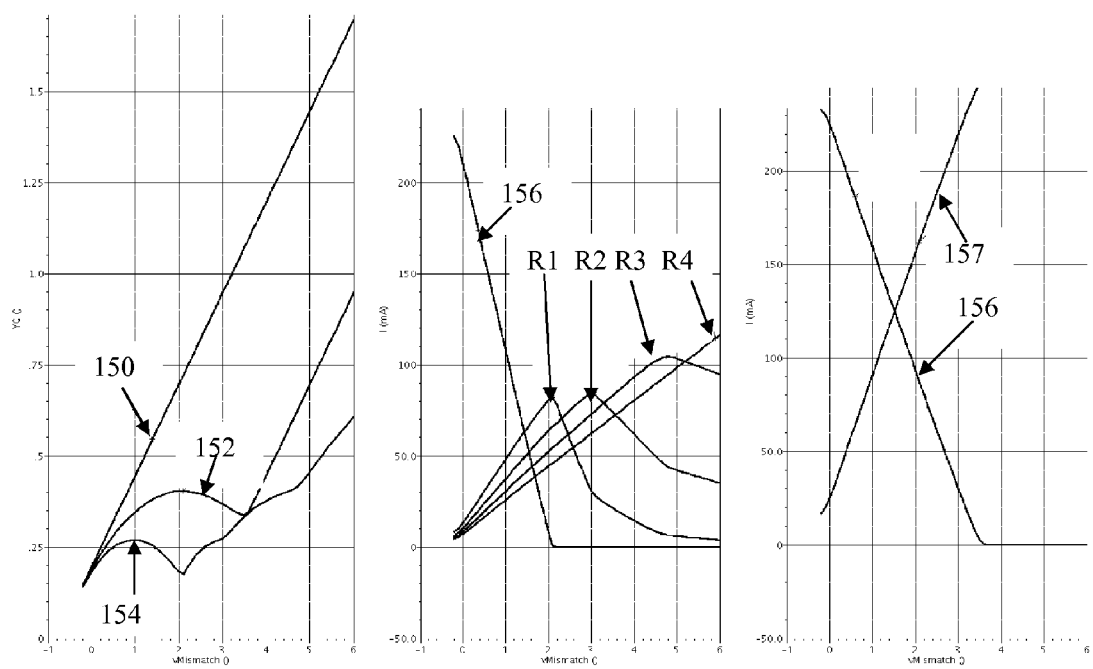
FIG. 15 shows simulation results for the multi-path implementation of FIG. 14.

FIG. 15 shows simulation results for the multi R-path implementation of FIG. 14. For low $V_{FB}$, MRP1, MRP2, MRP3 and MRP4 are in linear region, the equivalent $R_{HEAT}$ is $R_{HEAT1}//R_{HEAT2}//R_{HEAT3}//R_{HEAT4}$ (the four resistors in parallel). When $V_{FB}$ increases, MRP1 switches off followed by MPR2 and then by MRP3 (this is shown in the middle graph) leading to a progressive increase of the equivalent $R_{HEAT}$.

The left graph of FIG. 15 shows the IC power dissipation for different $V_{FB}$ values. Plot 150 is without the heat dissipation concept, plot 152 is for a single R-path and plot 154 is for the 4 R-paths implementation.

$R_{HEAT}$ in the case of a single R-path is 12Ω and for the 4 R-path, $R_{HEAT1}$=3/6*4*12Ω, $R_{HEAT2}$=4/6*4*12Ω, $R_{HEAT3}$=5/6*4*12Ω, $R_{HEAT4}$=4*12Ω.

The middle graph in FIG. 15 shows the current passing through the direct path (I1)—plot 156—and through the resistors (together forming I2)—plots R1 to R4—as a function of $V_{FB}$ and for the four R-paths in the 4-path implementation. The right graph in FIG. 15 again shows the current passing through the direct path (I1)—plot 156—and through the single resistor (I2)—plot 157—as a function of $V_{FB}$ and for a single R-path implementation.

Figure 16:
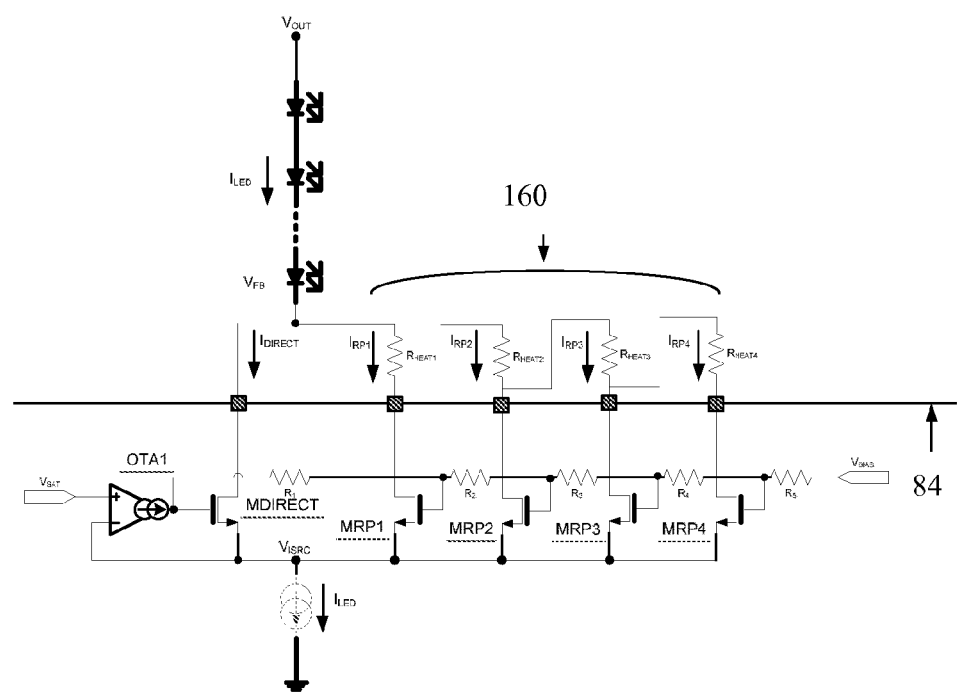
FIG. 16 shows a further modification to the circuit of FIG. 9 with multiple series resistive paths.
Figure 17:
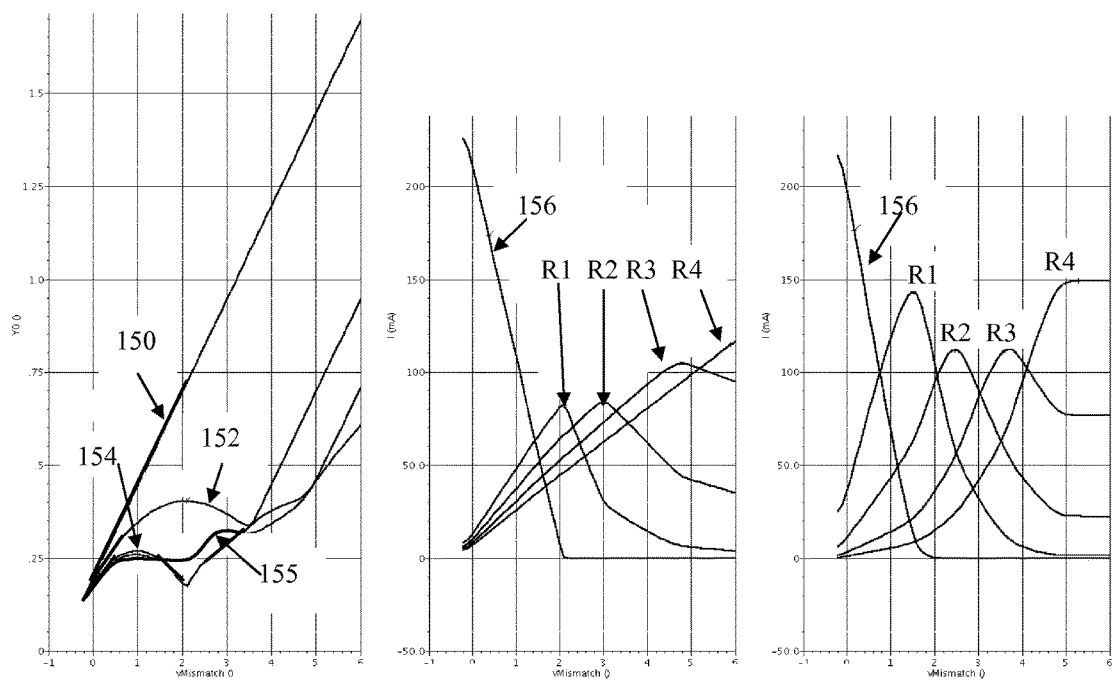
FIG. 17 shows simulation results for the multi-path implementation of FIG. 16.

A variant with heat dissipating resistors placed in series as arrangement 160 is also possible as shown in FIG. 16. In this configuration, $R_{HEAT1}$, $R_{HEAT2}$, $R_{HEAT3}$ and $R_{HEAT4}$ are set equal to 12Ω/4. FIG. 17 shows the same plots as in FIG. 15. The left graph adds the power dissipation curve 155 for the series resistor arrangement. The middle graph is the same as in FIG. 15, and the right graph shows the current contributions from the resistors in the series arrangement (for comparison with the middle graph).

The invention enables is a significant cost reduction of the total solution. The reduction of the heat dissipation within the IC will allow reducing the number of used components, ICs as well as discrete components.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An LED driver for driving a plurality of strings of LEDs, comprising:
    an integrated circuit chip comprising;
    a controller for controlling a voltage or a current flow applied to one end of each of the strings of LEDs in dependence on voltages measured at the other ends of the strings of LEDs;
    a respective current controller for each string of LEDs for controlling the current in each string of LEDs independently;
    a current balancing arrangement for each string of LEDs;
    wherein the controller, the respective current controllers, and the current balancing arrangements are inside the integrated circuit chip;
    first and second paths for each string of LEDs that are outside of the integrated circuit chip and that connect the other end of each corresponding string of LEDs to the integrated circuit chip, wherein the first path for each string of LEDs comprises a heat dissipater;
    wherein the other end of each string of LEDs is connected to the integrated circuit chip at first and second pins of the integrated circuit chip through the corresponding first and second paths such that one end of a single string of LEDs is connected to the integrated circuit by two different string-specific pins;
    wherein the first and second pins and the corresponding first and second paths are connected separately to the current balancing arrangement and the current balancing arrangement is adapted to control the splitting of the current through the LED string between the first and second paths.

2. The LED driver of claim 1, further comprising:
    a plurality of threshold circuits, wherein each threshold circuit comprises a comparator for comparing the voltage at the other end of a respective string of LEDs with a respective string-specific threshold voltage, wherein each threshold circuit includes means for capturing and storing the voltage at the other end of the respective string of LEDs and a multiplexer for selecting either a common minimum voltage threshold or the respective stored voltage as the respective string-specific threshold voltage, wherein each of the respective comparators provides a threshold circuit output based on the comparison of the voltage at the other end of a respective string of LEDs with the respective string-specific threshold voltage; and a combiner for combining the threshold circuit outputs thereby to generate a signal for controlling the controller, wherein the combiner is configured to output a stop charging signal when the voltage at the other end of a respective string of LEDs exceeds the common minimum voltage threshold for all of the strings of LEDs;

wherein the controller, plurality of threshold circuits, and the combiner are configured to:

control a voltage or a current flow applied to one end of each of the strings of LEDs;

compare the voltage at the other end of a respective string of LEDs with a respective string-specific threshold voltage; and combine the threshold comparisons and control the controller based on the combination;

and further to determine the respective string-specific threshold voltages by:

applying an increasing voltage to the one end of the strings of LEDs;

monitoring the voltages at the other end of the strings of LEDs by comparing the voltage at the other end of a respective string of LEDs for each of the strings of LEDs with a common minimum threshold; and when the voltage at the other end of all of the strings of LEDs has reached the common minimum threshold, store the voltages at the other end of all of the strings for each different string of LEDs as a set of the individual string-specific threshold voltages for the different strings of LEDs and use the set of stored individual string-specific threshold voltages as the respective string-specific threshold voltages for subsequent voltage comparisons.

3. A driver as claimed in claim 2, wherein each string-specific threshold voltage comprises the voltage at the other end of the string of LEDs in response to the same voltage applied to the one end of the string of LEDs.

4. A driver as claimed in claim 1, wherein the current controller is a PWM controller.

5. A driver as claimed in claim 1, wherein the current balancing arrangement comprises a feedback path for maintaining constant a biasing voltage for the integrated circuit chip.

6. A driver as claimed in claim 1, wherein the heat dissipater comprises:
   a single resistor; or
   a parallel set of resistors each having an associated control transistor; or
   a series set of resistors each having an associated control transistor.

7. A driver as claimed in claim 6, wherein the heat dissipater comprises a set of resistors, wherein the associated control transistors are each between a terminal of the associated resistor and a common terminal, and the current balancing arrangement is adapted to control a first transistor in the second path and the set of control transistors.

8. A method of controlling a plurality of strings of LEDs, comprising:
   controlling a voltage or a current flow applied to one end of each of the strings of LEDs in dependence on voltages measured at the other ends of the strings of LEDs;
   separately coupling the other end of each string of LEDs to a respective current balancing arrangement which is inside an integrated circuit chip, through first and second pins of the integrated circuit chip and through corresponding first and second paths that are outside of the integrated circuit chip such that one end of a single string of LEDs is connected to the integrated circuit by two different string-specific pins, the first path comprising a heat dissipater which is also outside the integrated circuit chip; and
   via a current balancing circuit that is inside the integrated circuit chip, controlling the splitting of the current through each LED string between the first and second paths.

9. The method of claim 8, further comprising:
   comparing the voltage at the other end of a respective string of LEDs with a respective string-specific threshold voltage; and
   combining the threshold comparisons and controlling the controller based on the combination;
   further comprising determining the respective string-specific threshold voltages by:
   applying an increasing voltage to the one end of the strings of LEDs;
   monitoring the voltages at the other end of the strings of LEDs by comparing the voltage at the other end of a respective string of LEDs for each of the strings of LEDs with a common minimum threshold;
   when the voltage at the other end of all of the strings of LEDs has reached the common minimum threshold, storing the voltages at the other end of all of the strings for each different string of LEDs as a set of the individual string-specific threshold voltages for the different strings of LEDs and using the set of stored individual string-specific threshold voltages as the respective string-specific threshold voltages for subsequent voltage comparisons.

10. A method as claimed in claim 8, comprising maintaining constant a biasing voltage ($V_{ISRC}$) for the integrated circuit chip.

11. A method as claimed in claim 8, wherein the heat dissipater comprises:
    a single resistor; or
    a parallel set of resistors each having an associated control transistor; or
    a series set of resistors each having an associated control transistor.

12. A method as claimed in claim 11, wherein the heat dissipater comprises a set of resistors, wherein the associated control transistors are each between a terminal of the associated resistor and a common terminal, and the method comprises control a first transistor in the second path and the set of control transistors.

* * * * *